United States Patent
Usukura et al.

(10) Patent No.: US 9,810,948 B2
(45) Date of Patent: Nov. 7, 2017

(54) SPATIAL LIGHT MODULATOR COMPRISING A LIQUID CRYSTAL DEVICE HAVING REDUCED STRAY LIGHT

(75) Inventors: Naru Usukura, Osaka (JP); Hiromi Katoh, Osaka (JP); Yuichi Kanbayashi, Osaka (JP); Norbert Leister, Dresden (DE); Ralf Haussler, Dresden (DE)

(73) Assignees: SHARP KABUSHIKI KAISHA, Osaka (JP); SEEREAL TECHNOLOGIES S.A., Munsbach (LU)

( * ) Notice: Subject to any disclaimer, the term of this patent is extended or adjusted under 35 U.S.C. 154(b) by 88 days.

(21) Appl. No.: 14/425,674

(22) PCT Filed: Sep. 5, 2012

(86) PCT No.: PCT/EP2012/067311
§ 371 (c)(1),
(2), (4) Date: Jun. 9, 2015

(87) PCT Pub. No.: WO2014/037036
PCT Pub. Date: Mar. 13, 2014

(65) Prior Publication Data
US 2015/0293409 A1    Oct. 15, 2015

(51) Int. Cl.
*G02F 1/1337* (2006.01)
*G02F 1/1347* (2006.01)
(Continued)

(52) U.S. Cl.
CPC ... *G02F 1/133753* (2013.01); *G02B 27/2214* (2013.01); *G02F 1/1337* (2013.01);
(Continued)

(58) Field of Classification Search
CPC .................................................. G02F 1/133753
See application file for complete search history.

(56) References Cited

U.S. PATENT DOCUMENTS

| | | | |
|---|---|---|---|
| 6,593,987 B1 | 7/2003 | Walton et al. | |
| 2005/0248705 A1* | 11/2005 | Smith | G02B 5/3016 349/124 |
| 2014/0055692 A1* | 2/2014 | Kroll | G02F 1/1347 349/15 |

FOREIGN PATENT DOCUMENTS

| | | | |
|---|---|---|---|
| DE | WO 2010149587 A2 * | 12/2010 | G02F 1/134309 |
| WO | 2010/149587 A2 | 12/2010 | |

OTHER PUBLICATIONS

International Search Report, dated May 17, 2013, and Written Opinion issued in International Application No. PCT/EP2012/067311.

(Continued)

*Primary Examiner* — Edmond Lau
(74) *Attorney, Agent, or Firm* — Saul Ewing Arnstein & Lehr LLP

(57) ABSTRACT

The present invention relates to a controllable diffraction device for a light modulator device. The controllable diffraction device comprises at least two substrates, at least one electrode on each of said substrates facing each other, and liquid crystals forming at least one liquid crystal layer arranged between said electrodes on said substrates. The orientation of the liquid crystals is controllable by a voltage supplied to the electrodes. The liquid crystal layer is provided on at least one alignment layer arranged on at least one electrode on said substrates. The liquid crystals close to the alignment layer are pre-oriented by at least one pre-tilt angle relative to the alignment layer such that the resulting light diffraction in opposite spatial directions is approximately equal.

13 Claims, 8 Drawing Sheets

(51) Int. Cl.
*G02F 1/139* (2006.01)
*G02F 1/29* (2006.01)
*G03H 1/22* (2006.01)
*G02B 27/22* (2006.01)
*G02F 1/1343* (2006.01)

(52) U.S. Cl.
CPC ........ *G02F 1/1393* (2013.01); *G02F 1/13471* (2013.01); *G02F 1/292* (2013.01); *G03H 1/2205* (2013.01); *G03H 1/2294* (2013.01); *G02F 1/134309* (2013.01); *G02F 2001/13373* (2013.01); *G02F 2001/133738* (2013.01); *G02F 2001/133742* (2013.01); *G02F 2001/133746* (2013.01); *G02F 2001/133749* (2013.01); *G02F 2001/133761* (2013.01); *G02F 2001/133769* (2013.01); *G02F 2201/305* (2013.01); *G02F 2203/24* (2013.01); *G03H 2001/2242* (2013.01); *G03H 2223/23* (2013.01); *G03H 2225/11* (2013.01); *G03H 2225/22* (2013.01)

(56) References Cited

OTHER PUBLICATIONS

Brown et al., "Optical diffraction from a liquid crystal phase grating," J. of Applied Physics, American Institute of Physice, vol. 91, No. 6, pp. 3495-3500 (Mar. 15, 2002) XP012055981.

Sharf et al., "Multilevel nematic liquid crystal phase gratings," Proc. of SPIE, vol. 4418, pp. 31-37 (May 30, 2001) XP055061767.

Bovier, "Analysis of nematic-liquid-crystal binary gratings with high spatial frequency," Optical Engineering, vol. 39, No. 8, pp. 2129 (Aug. 2000) XP055061535.

McManamon et al., "A review of phased array steering for narrowband electrooptical systems," Proc. of the IEEE, vol. 97, No. 6, pp. 1078-1096 (Jun. 6, 2009) XP011257780.

Chen et al., "A high-brightness diffractive stereoscopic display technology," Displays Devices, Dempa Publications, vol. 31, No. 4-5, pp. 169-174 (Jun. 17, 2010) XP027437197.

\* cited by examiner

SPATIAL LIGHT MODULATOR COMPRISING A LIQUID CRYSTAL DEVICE HAVING REDUCED STRAY LIGHT

CROSS REFERENCE TO RELATED APPLICATIONS

This application claims the priority of PCT/EP2012/067311, filed on Sep. 5, 2012, the entire contents of which is incorporated fully herein by reference.

BACKGROUND OF THE INVENTION

The present invention relates to a controllable diffraction device for a light modulator device used for a display for the presentation of two- and/or three-dimensional image contents or image sequences. Thereby, the controllable diffraction device comprises at least two substrates, at least one electrode on each of said substrates facing each other, and liquid crystals forming at least one liquid crystal layer arranged between said electrodes on said substrates, whereby the orientation of the liquid crystals is controllable by a voltage supplied to the electrodes and the liquid crystal layer is provided on at least one alignment layer arranged on at least one electrode on said substrates.

A controllable diffraction device is for example described in WO 2010/149587 A2. This reference provides a light modulation device comprising a (spatial) light modulator, a controller and a diffraction device, which has a variable diffracting structure. Thereby, the phase and/or the amplitude of a light wave field, which is substantially collimated, can be varied by means of the light modulated depending on the location of the light modulator. The (spatial) light modulator is controlled by the control device. Moreover, the light wave field varied by the (spatial) light modulator can be diffracted in a variable and predetermined manner by the diffraction device having the variable diffracting structure. In order to provide a holographic reconstruction for an observer, the position of the observer is tracked and the variable diffraction unit deflects the light wave field according to the observer's position.

A controllable diffraction device as discussed above may be formed as a liquid crystal (LC) device and may be considered as a liquid crystal grating (LCG).

Thereby, the electrodes of said controllable diffraction device are controlled such that an electric field distribution is obtained in the diffraction device, which realizes at least regionally a saw-tooth shaped refractive index distribution with a presettable periodicity. This can be achieved for example in that in respect of one direction the neighbouring electrodes are supplied with different electric voltages. Consequently, an electric field is generated between two substrates of the diffraction device, which influences the orientation of liquid crystals arranged between the substrates such that a saw-tooth shaped phase profile is obtained providing a saw-tooth shaped refractive index distribution.

Thereby, the switching of orientation of the liquid crystals depends amongst other factors on the alignment layer and the applied electric field.

For example in the known Electronically Controlled Birefringence (ECB) mode, the LC molecules in a LC device are oriented in the absence of an electrical field by an angle, which is typically in the range of 3° to 8°, to the substrates and to the electrodes on these substrates due to surface alignment dominated by interactions between the alignment layer and the liquid crystals.

Moreover, LC molecules with a positive dielectric anisotropy are used for this mode. If the field is switched on, a force acts on the LC molecules to orient them parallel to the field that means rather perpendicular to the substrates.

The resulting orientation is achieved by a minimum of the sum of surface anchoring energy, elastic energy of the LC and energy by interaction with the field.

As a further example, LC molecules with negative dielectric anisotropy are used for a LC device based on the Vertical Aligned (VA) mode. Thereby, the LC molecules are oriented by an angle, which is typically around 82° to 87°, to the substrates due to the interaction with the alignment layer, and a force to orient them rather parallel to the substrate acts on them if an electric field is applied.

In the ECB mode, two possible rotation directions—either clockwise or counter-clockwise—for the LC molecules in the applied field are possible if no angular pre-orientation is provided.

However, said arrangement of the LC molecules parallel to the substrate would result in domain formation, whereby in some domains LC molecules orient clockwise and in other domains LC molecules orient counter-clockwise. This effect leads to disclinations, which have negative influence to the optical performance of the LC device.

In order to avoid domain formation, the LC molecules close to the alignment layer may be pre-oriented by a pre-tilt angle relative to the alignment layer. For example, as mentioned above for the ECB mode, LC molecules oriented by 8° clockwise due to the surface alignment have only a 82° clockwise rotation angle in order to be parallel to the field but would need a 98° degree counter-clockwise rotation angle. As a consequence, clockwise rotation is energetically preferred and all molecules rotate in the same sense.

This pre-tilt can also be induced by rubbing. For example rubbing direction from left to right may cause a counter-clockwise pre-tilt and rubbing from right to left causes a clockwise pre-tilt. The amount of the pre-tilt angle depends also on the type of polyimide material. For example, LC devices with out-of-plane rotation such as Twisted Nematic (TN) devices or ECB devices provide pre-tilt angles in the range of 3° to 8°. Thereby, the rubbing strength may be a parameter to define the value of the pre-tilt angle.

Furthermore, also other types of alignment exist, for example photo-alignment by use of polarized UV-Light. Thereby, the irradiation time or the heating temperatures may be parameters to define the value of the pre-tilt angle. Moreover, a procedure typical for inorganic alignment layers is evaporation of the layer at oblique incidence.

Treatment of the alignment layer for example by one of the above mentioned methods thus creates a preferred direction for orientation of the LC molecules close to the alignment layer. The other LC molecules further away from the alignment layer will also preferably orient in the same direction due to elastic forces among the LC molecules. For example in case of mechanical rubbing this preferred direction is almost parallel to the rubbing direction. One possible explanation for this effect is that polymer side chains of the alignment layer material are oriented by the rubbing procedure and the LC molecules preferably orient parallel to these side-chains.

In an electrical field because of their dielectric anisotropy LC molecules tend to orient in the field. If their dielectric anisotropy is positive they preferably orient parallel to the field, if it is negative they orient perpendicular to the field.

Moreover, the pre-tilt angle influences the viewing angle performance in some LC devices. In a VA liquid crystal display, for example, there is typically a Multi-domain vertical alignment (MVA) configuration that means there are different domains within one pixel having the same amount of polar pre-tilt angle but different alignment direction, which corresponds to a azimuthal angle of LC orientation.

For these types of saw-tooth gratings, it is not possible to write a perfect prism type (saw-tooth shaped) phase profiles. Due to electrode structures and smoothing by the elastic response of the LC molecules, falling edges of the phase profile exist reducing diffraction efficiency of the deflection grating structure in the desired order. It is thus desired to keep the falling edge of the prism as small as possible.

For the use of such a deflection device for observer tracking it is desired to have a large angular deflection range. Especially it is desired to have a symmetrical tracking range. That means the deflection element should deflect for example to the right side and to the left side to approximately the same angle and with the same efficiency.

SUMMARY OF THE INVENTION

It is therefore an object of the present invention to provide and further develop a controllable diffraction device for a light modulator device, a display and a method for displaying two- and/or three-dimensional image content or image sequences of the above-mentioned type which overcome or reduce at least one of the aforementioned problems.

Regarding the controllable diffraction device, the object of this invention is solved by the teachings of claim 1. Further preferred embodiments and enhancements of the present invention are defined in the dependent claims.

According to the invention, the liquid crystals close to the alignment layer are pre-oriented by at least one pre-tilt angle relative to the alignment layer such that the resulting light diffraction in opposite spatial directions is approximately equal. Thereby, the pre-tilt angle is chosen to ensure approximately equal saw-tooth-shaped refractive index distributions for light diffraction in the left/right or upward/downward direction.

Throughout this document the following convention is used: The substrate is oriented with its surface parallel to the x,y plane of a three-dimensional coordinate system (x,y,z) The electrode lines are oriented along the y-axis. Then the polar angle is defined as $\theta = \arcsin(z/r)$ with $r = \sqrt{x^2+y^2+z^2}$. That means a polar angle of 0 would be parallel to the substrate plane. The azimuthal angle is defined as $\phi = a \tan 2(y,x)$, whereby a tan 2 is defined like the C-Programming function. An azimuthal angle of 0 defines that the orientation of LC molecules is perpendicular to electrode lines.

In particular, a polar pre-tilt angle $\theta$ is set to a value enabling a unidirectional rotation of the orientation of the liquid crystals in the liquid crystal layer. Thereby, the polar pre-tilt angle $\theta$ is minimized in order to provide an approximately equal light diffraction in opposite spatial directions, whereby the liquid crystals in the liquid crystal layer are still pre-orientated to allow a common rotation direction in the electric field. Thereby, the saw-tooth-shaped phase profiles for example the left and right directions are approximately equal since smoothing effects, which are responsible for different phase profiles in opposite directions, are minimized.

In a preferred embodiment, the polar pre-tilt angle $\theta$ is in the range of $0° < \theta \leq 3°$ in the Electronically Controlled Birefringence (ECB) mode or $87° \leq \theta < 90°$ in the Vertically Aligned (VA) mode. In a more preferred embodiment, the polar pre-tilt angle is in the range of $0° < \theta \leq 2°$ in the ECB mode or $88° \leq \theta < 90°$ in the VA mode.

In a preferred embodiment of the present invention, the pre-orientation of the liquid crystals close to the alignment layer is further determined by at least one azimuthal pre-tilt angle $\phi$ in order to achieve a uniform distribution of the LC molecules near to the alignment layer.

In another embodiment of the present invention, different areas of the alignment layer could provide different azimuthal pre-tilt angles $\phi$. Thereby, different orientation distributions of the liquid crystals are achieved which may be used for further improving the diffraction efficiency of the controllable diffraction device.

In particular, the areas of the alignment layer may be arranged repetitively in the form of stripes and the azimuthal pre-tilt angles $\phi$ are alternately $\phi_1 = 0°$ and $\phi_2 = 180°$. Thereby, the LC molecules are pre-oriented by a polar pre-tilt angle $\theta$ according to ECB or VA mode conditions as well, which may be the same for all stripes. Although single stripes with $\phi_1 = 0°$ and $\phi_2 = 180°$ provide different diffraction efficiencies in opposite directions due to different senses of rotation of the LC molecules within said stripes, the averaged total diffraction efficiency for opposite directions is equal due to the repetitive and alternating arrangement of stripes with $\phi_1 = 0°$ and $\phi_2 = 180°$.

In a further embodiment according to the ECB mode, approximately 50% of the area of the controllable diffraction device according to the present invention could consequently further provide a polar pre-tilt angle $0° < \theta \leq 3°$, more preferably $0° < \theta \leq 2°$, with an azimuthal pre-tilt angle $\phi_1 = 0°$ and 50% of the area may provide a polar pre-tilt angle $0° < \theta \leq 3°$, more preferably $0° < \theta \leq 2°$, with an azimuthal pre-tilt angle $\phi_2 = 180°$.

In another embodiment according to the VA mode, approximately 50% of the area of the controllable diffraction device according to the present invention could consequently further provide a polar pre-tilt angle $87° \leq \theta < 90°$ with an azimuthal pre-tilt angle $\phi_1 = 0°$ and 50% of the area may provide a polar pre-tilt angle $87° \leq \theta < 90°$, more preferably $88° \leq \theta < 90°$, with an azimuthal pre-tilt angle $\phi_2 = 180°$.

Consequently, a controllable diffraction device according to these embodiments of the present invention provides in general a liquid crystal grating with an approximately 50% area having a slightly higher diffraction efficiency in a first direction and an approximately 50% area part having a slightly higher diffraction efficiency in a opposite second direction. Averaging over the whole area of the liquid crystal grating provides the same averaged diffraction efficiency for the diffraction in the left and right direction.

In a holographic display comprising at least one spatial light modulator (SLM) and at least one controllable diffraction device according to the present invention, the width of the stripes of different azimuthal pre-tilt angles $\theta$ is set such that it is smaller than or that it corresponds to approximately one half of the pixel pitch of the pixels of the SLM in the width direction of the stripes. Similarly, for a controllable diffraction device with vertically aligned electrodes and horizontally aligned stripes, the width of the stripes is set such that it is smaller than or that it corresponds to one half of the vertical pixel pitch of the SLM. Consequently, light emitted by a pixel of the SLM can be diffracted by the liquid crystal grating with the same efficiency in opposite directions (right/left or up/down).

According to another embodiment of the present invention, the controllable diffraction device comprises at least two alignment layers, whereby the polar pre-tilt angle is in the range of $10° \leq \theta \leq 30°$, more preferably $10° \leq \theta \leq 20°$, or $60° \leq \theta \leq 80°$, more preferably $70° \leq \theta \leq 80°$, and the alignment layers provide different azimuthal pre-tilt angles $\phi$. In particular, the azimuthal pre-tilt angles ϕ are $\phi_1=0°$ for the first alignment layer and $\phi_2=180°$ for the second alignment layer. Thus, the controllable diffraction device provides two different liquid crystal gratings, whereby the pre-tilt angle is chosen so that the first liquid crystal grating provides an improved diffraction for example only in the left direction and the second liquid crystal grating provides an improved diffraction for example only in the right direction. Similarly, the two liquid crystal gratings can be arranged so that the deflection is oriented upwardly or downwardly, respectively. The improvements in the respective directions are caused by the reduced rotation angles of the LC molecules in the electric field and ensure an increased sharpness for the saw-tooth-shaped refractive index distribution in one direction.

In detail, two liquid crystal gratings can be stacked above each other in the z-direction. Thereby, voltages are only applied to the first liquid crystal grating in order to accomplish an improved light diffraction for example in the second direction. Likewise, voltages are only applied to the second liquid crystal grating in order to accomplish an improved light diffraction for example in the opposite first direction. Thereby, an equal and improved diffraction efficiency for both opposite directions is accomplished due to the selective driving of the first or the second liquid crystal grating.

According to a further preferred embodiment, the alignment layer may be configured to allow the switching of the azimuthal pre-tilt angle ϕ as discussed in WO 2011/039286 A1. Thereby, the azimuthal pre-tilt angle ϕ may be switched by 180°, in particular between $\phi_1=0°$ and $\phi_2=180°$. Thus, the diffraction efficiency for the left and right direction (or upwards and downwards) may be variably adjusted, whereby the diffraction efficiency relates to the polar pre-tilt angle θ in the electric field and the sense of rotation of the LC molecules as discussed above. Consequently, by generally switching the azimuthal pre-tilt angle ϕ by 180°, equal phase profile distributions for opposite directions may be accomplished. In other words, the azimuthal pre-tilt angle ϕ may be switched between $\phi_1=0°$ and $\phi_2=180°$ dependent on the applied voltage profiles for generating the saw-tooth-shaped refractive index distribution according to a first or an opposite second diffraction direction.

In general, the electrodes could be arranged such that an electric field distribution is obtained which realizes at least regionally a saw-tooth-shaped diffractive structure, when voltages are applied to the electrodes as described above.

Regarding a display, the object mentioned above is solved by the teaching of claim 12. Accordingly, a display comprises a light modulator device and at least one controllable diffraction device according to one of the claims 1 to 11. The display is designed such that stereoscopic image contents and/or stereoscopic multi-view image contents and/or holographic image contents are presentable.

According to a preferred embodiment, the display further comprises a spatial light modulator with pixels comprising a pixel pitch. Areas of the alignment layer of the controllable diffraction device are arranged repetitively in the form of stripes and the azimuthal pre-tilt angles ϕ are alternately $\phi_1=0°$ and $\phi_2=180°$. The width of the stripes is set such that it is smaller than one half of the pixel pitch of the pixels of the spatial light modulator. Alternatively, the width of the stripes is set such that it corresponds to one half of the pixel pitch of the pixels of the spatial light modulator.

Regarding a method, the object mentioned above is solved by the teaching of the claims. Accordingly, a method for displaying two- and/or three-dimensional image content or image sequences comprises the following steps:

varying the phase and/or amplitude of a substantially collimated light wave field by a light modulation device comprising a light modulator and a controller;

diffracting the light wave field by at least one controllable diffraction device according to the claims having a variable diffraction structure.

BRIEF DESCRIPTION OF THE DRAWINGS

There are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally, preferred physical forms and continuations of the teaching will be explained in conjunction with the description of the preferred embodiments of the invention and the accompanying drawings. The figures are schematic drawings, where

Identical or comparable parts are given like numerals in all figures.

DETAILED DESCRIPTION OF THE INVENTION

Figure 1A:
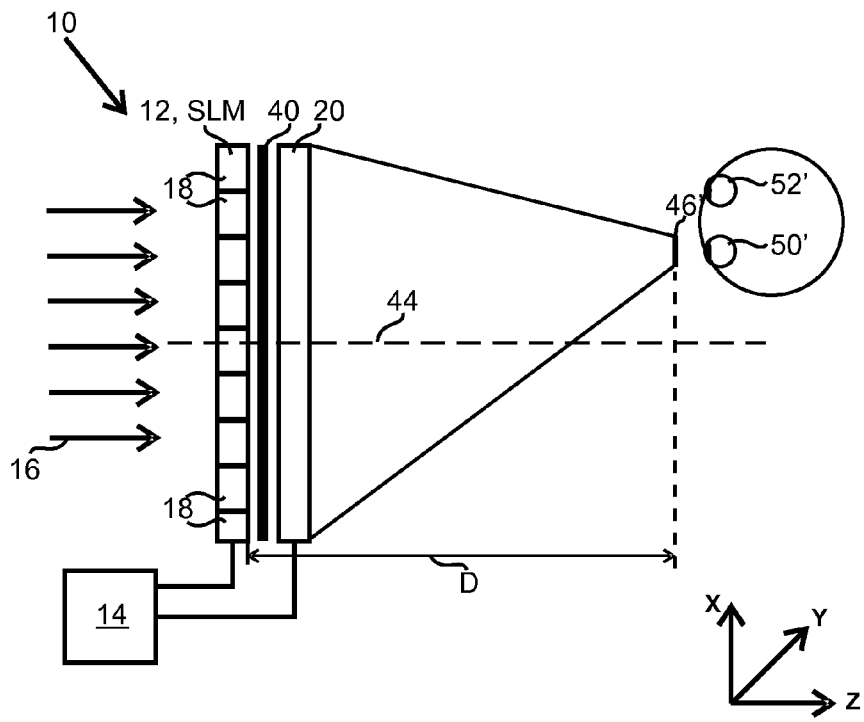
FIG. 1A is a top view that shows a light modulator device comprising a controllable diffraction device according to the present invention, which diffracts light to an observer at a first position.

FIG. 1A shows a light modulator device 10 for a display (not shown in the figures.) for the presentation of two- and/or three-dimensional image contents. The light modulator device 10 comprises a light modulator 12 (SLM) and a control unit 14. The light modulator 12 is illuminated by a collimated light wave field 16, which is indicated by the arrows in FIG. 1. The phase and/or amplitude of a collimated light wave field 16 can be varied by the light modulator 12 in dependence on the location on the light modulator 12. For this, the light modulator 12 comprises individual pixels 18 (magnified in the drawing), which are arranged in a matrix. The light modulator 12 is operated by the control unit 14. According to an embodiment of the invention, at least one controllable diffraction device 20 is arranged downstream of the light modulator, seen in the direction of propagation of the light wave field 16. The diffraction device 20 is also operated by the control unit 14; however, it could alternatively be operated by a separate control unit. The diffraction device 20 comprises a variable diffractive structure, depending on how the diffraction device 20 is actually operated. This diffractive structure variably diffracts the light wave field 16, which has been modulated by the light modulator 12, in a pre-settable way. According to FIG. 1A, an observer with observer eyes 50', 52' is situated in a first position shifted from the central axis 44 of the light modulator device 10 and at a distance D to the light modulator 12. Thus, light is diffracted to a first observer window 46' by the controllable diffraction device 20.

Figure 1B:
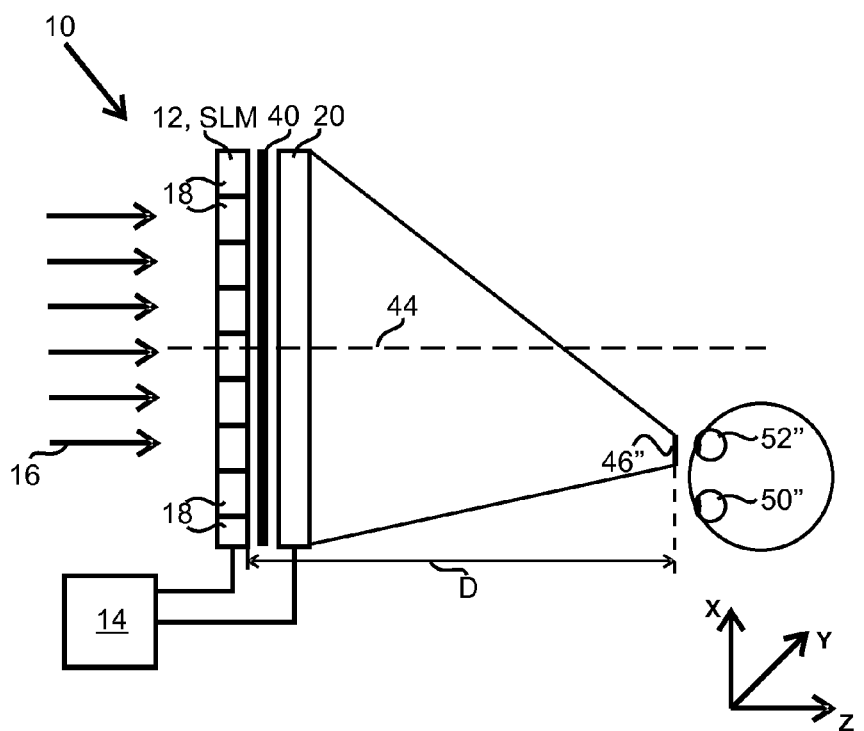
FIG. 1B is a top view similar to FIG. 1A, whereby light is diffracted to an observer at a second position.

In FIG. 1B, the observer with observer eyes 50', 52' is situated in a second position shifted the central axis 44 of the light modulator device 10 and at a distance D to the light modulator 12. Thus, light is diffracted to a second observer window 46' by the controllable diffraction device 20.

In the displays shown in FIGS. 1A and 1B, a field lens function of the display can be realised in that a focusing optical component 40 is provided in the form of a Bragg grating. This component focuses or deflects the light beams of the light wave field 16 which pass through the light 20 modulator 12 towards central observer positions as explained in WO 2010/149587 A2. The central observer positions are arranged in symmetry to the central axis 44 of the light modulator device 10 and at a distance D to the light modulator 12. The central observer positions comprise two observer windows. The diffraction device 20 makes it possible to realise a lateral tracking of the observer windows to the current position of observer eyes 50, 52 in that corresponding diffractive structures are written to the diffraction device 20. The tracked observer windows are denoted by the reference numerals 46' and 46".

The display which includes a light modulator device 10 and a controllable diffraction device 20 of the present invention can specifically be designed such that stereoscopic and/or stereoscopic multi-view image contents and/or holographic image contents can be presented.

Figure 2:
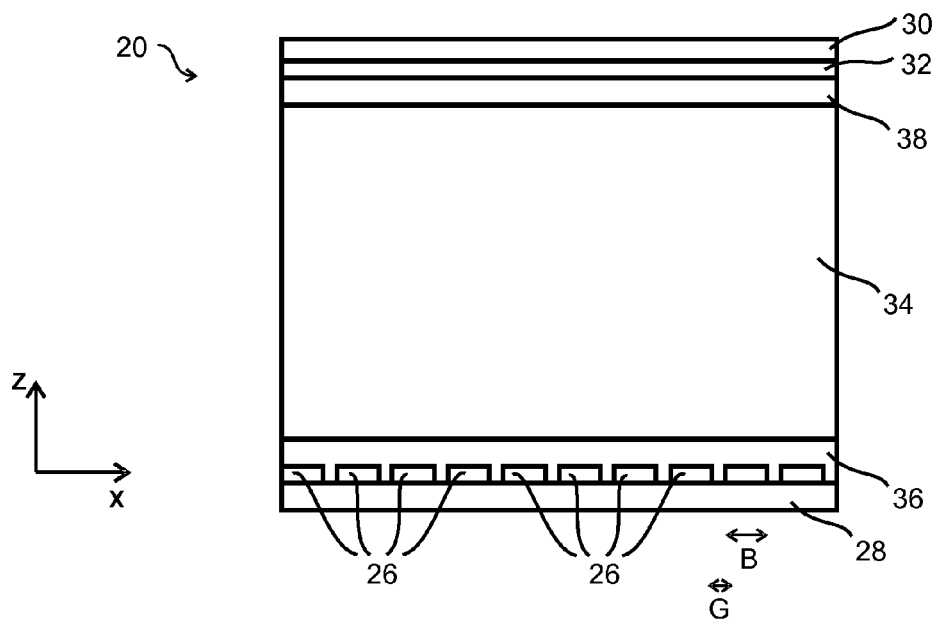
FIG. 2 is a side view that shows details of a controllable diffraction device of the present invention.

FIG. 2 is a sectional view of the controllable diffraction device 20, where the diffraction device 20 shall be understood to continue to the left and to the right, or to either side, such that the diffraction device 20 covers the entire width of the light modulator 12 which is shown in FIG. 1. The linear electrodes 26 which are arranged at the first substrate 28 have a width B of 1.5 µm in this embodiment. The width of the gap G between two neighbouring electrodes 26 is 0.5 µm. It is possible for the electrodes 26 and gaps between neighbouring electrodes 26 to have widths which differ from the above-mentioned values, this depends in particular on the intended application of the display and on the concrete design of the light modulator 12.

Moreover, the controllable diffraction device 20 comprises a second substrate 30, which is arranged at a distance from the first substrate 28. The second substrate 30 has a planar electrode 32. Thereby, it is possible that different electrode arrangements (e.g. buried electrodes) as disclosed in WO 2010/149587 A2 may be used on the first and second substrates 28, 30.

Furthermore, the controllable diffraction device 20 comprises a first alignment layer 36 and a second alignment layer 38, which are arranged on the linear electrodes 26 and on the planar electrode 32, respectively.

A layer 34 with liquid crystals (LC) is provided between the first substrate 28 and the second substrate 30 of the diffraction device 20. The orientation of the liquid crystals can be affected in that a pre-settable electric voltage is applied to the electrodes 26. Thereby, the alignment layers 36, 38 further may serve to prevent an electric contact between the liquid crystals and electrodes 26 and 32.

Moreover, the alignment layers 36, 38 pre-orient those LC molecules, which are close to the alignment layer, relative to the substrates 28, 32 in an angular geometry. Other LC molecules further away from the alignment layer will also preferably orient in the same direction due to elastic forces between the LC molecules. As discussed above, the alignment layers 26, 38 may be polyimide polymer layers. Furthermore, there exist many other types of alignment layers, for example inorganic alignment layers. Known techniques to achieve defined pre-tilt angles of the LC molecules close to the alignment layer and relative to the substrate are for example mechanical rubbing (also called buffing) of the polymer alignment layer, photoalignment using polarized UV-light, evaporation of the alignment layer at oblique incidence etc.

The electrodes 26, 32 of the first and second substrate 28, 30 are transparent for the used light. The same goes for the first and second substrate 28, 30. The refractive index of the electrodes 26, 32 and the refractive index of the substrates 28, 30 could be chosen such that they are substantially identical to each other. Further, the refractive index of the electrodes 26, 32 and the refractive index of the alignment layers 36, 38 could be chosen such that they are substantially identical to each other.

Figure 3:
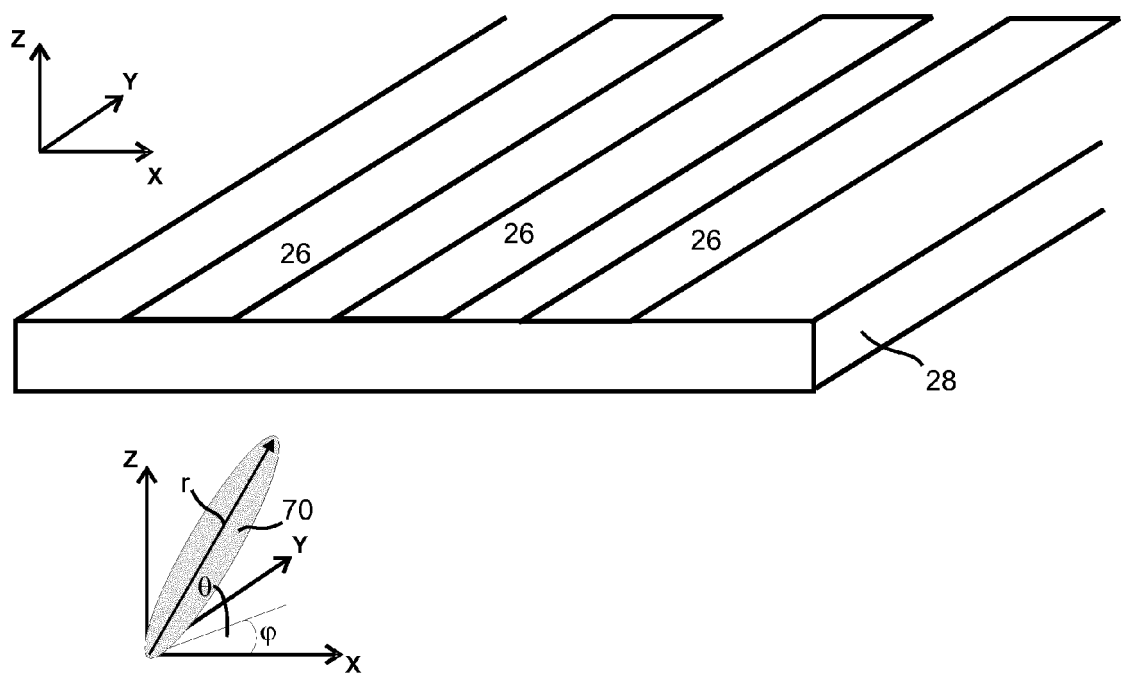
FIG. 3 is a perspective view that shows a substrate of the controllable diffraction device and a schematic liquid crystal molecule in a three-dimensional coordinate system.

FIG. 3 is a three-dimensional view of the first substrate 28 and the electrodes 26. Moreover, FIG. 3 shows the relationship between the three-dimensional coordinate system (x, y, z), a spherical coordinate system (r, θ, φ) and the first substrate 28 with the electrodes 26. In FIG. 3, the first substrate 28 is in the x y-plane of the three-dimensional coordinate system (x, y, z), whereby the electrodes 26 extend in the y-direction. For further clarification, a single LC molecule 70 with length r is shown. Thereby, the three-dimensional orientation of a LC molecule with length r may be generally defined by the polar angle θ and the azimuthal angle φ in spherical coordinates as follows:

$$r = \sqrt{x^2 + y^2 + z^2} \quad (1)$$

$$\phi = \text{atan2}(y, x) = \begin{cases} \arctan(y/x) & \text{for } x > 0 \\ \text{sgn}(y)\pi/2 & \text{for } x = 0 \\ \arctan(y/x) + \pi & \text{for } x < 0 \wedge y \geq 0 \\ \arctan(y/x) - \pi & \text{for } x < 0 \wedge y < 0 \end{cases} \quad (2)$$

$$\theta = \arcsin(z/r). \quad (3)$$

In some embodiments of the present invention, the y-component of the LC molecules orientation is set to 0. Consequently, the azimuthal angles are $\phi_1 = 0°$ or $\phi_2 = 180°$ ($\phi_1 = 0$ or $\phi_2 = \pi$). However, the present invention is not limited to these azimuthal angles.

Figure 4:
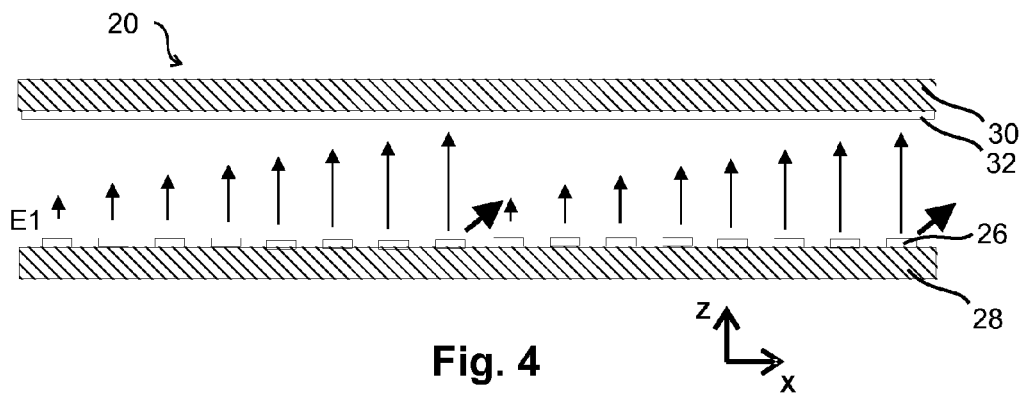
FIG. 4 is a side view that shows an electric field distribution of the controllable diffraction device.

FIG. 4 is a side view of the controllable deflection device 20. For clarification, only the substrates 28, 30 and the electrodes 26, 32 are shown. In FIG. 4, a saw-tooth shaped electric field distribution E1 is applied between the electrodes 26 and the planar electrode 32. The saw-tooth shaped electric field distribution E1 is characterized by an increasing electric field strength for each single electrode 26 within a grating period of the electrodes 26 in the controllable diffraction device 20. The increasing electric field strengths are indicated by the increasing arrows in the z-direction in FIG. 4. At the transition region 74 to the next grating period, the electric field strength sharply drops. The electric field distribution E1 can thus be described as a saw-tooth wave ramping upward and then sharply dropping. The reverse or inverse electric field distribution E2 would then be a saw-tooth wave in which the wave ramps downward and then sharply rises (not shown).

However, near the transition region 74 of the grating periods, the electric field components may extend not perpendicular to the substrates 28, 30, but inclined or diagonal electric field components exist as well, which are indicated by the two diagonal arrows in FIG. 4.

In general, the adjustable phase profile of the controllable diffraction device 20 is set due to the variable saw-tooth shaped electric field distributions: since the LC molecules in the liquid crystal layer 34 rotate or orient dependent on the increasing electric field strengths within a grating period, the phase index is changed according to orientation of the LC molecules. Thus, saw-tooth shaped phase profiles are realized by applying saw-tooth shaped electric field distributions E1 or E2 to the liquid crystal layer 34. Consequently, light can be diffracted in a first direction, if E1 is applied. In contrast, light can be diffracted in an opposite second direction, if E2 is applied.

Figure 5:
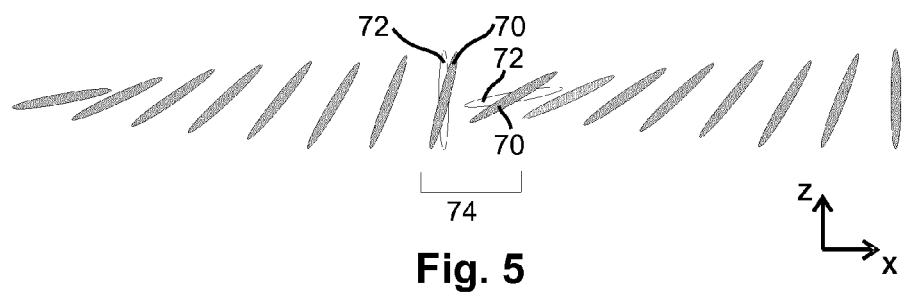
FIG. 5 is a side view that shows schematically liquid crystal molecules in an electric field distribution similar to FIG. 4, whereby smoothing effects between the liquid crystal molecules occur.

FIG. 5 is a side view showing in detail LC molecules 70 close to the alignment layer 36 in the electric field distribution E1 of FIG. 4, whereby only the LC molecules 70 are shown. In general, the LC molecules are pre-oriented due to the alignment layer 36. As an example, LC molecules in the Electronically Controlled Birefringence (ECB) mode are shown in FIG. 5. In the absence of an electrical field, the LC molecules 70 are only pre-oriented by the alignment layer. If the saw-tooth shaped electric field distribution E1 is switched on, a force acts on the LC molecules 70 to orient them parallel to the field leading to a counter-clockwise rotation. Consequently, higher field strengths lead to an increase of the orientation of the LC molecules into the z-direction, which is shown in FIG. 5.

However, a smoothing effect in the phase profile occurs at the transition region 74 of the grating periods: due to elastic forces between the LC molecules 70, molecules at the transition region 74 are not perfectly oriented according to the applied electric field (which would correspond to the two white LC molecules 72 near the transition region 74) but the resulting orientation of the molecules is also influenced by the elastic forces (grey LC molecules 70 near the transition region 74).

Figure 6A:
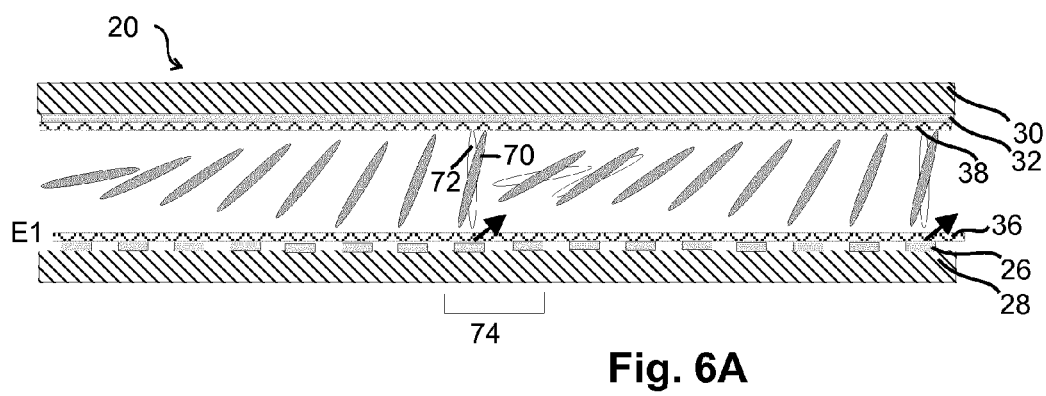
FIG. 6A is a side view that shows liquid crystals close to the alignment layer in a controllable diffraction device of the prior art diffracting light in a first direction.

FIG. 6A is a combination of FIG. 4 and FIG. 5 showing a side view of pre-oriented LC molecules close to alignment layer in the saw-tooth shaped electric field distribution E1. For reasons of clarity, the electric field vectors in the z-direction have been omitted in FIGS. 6A and 6B. Moreover, LC molecules 70 in FIGS. 6A and 6B are pre-oriented conventionally by a polar pre-tilt angle θ=8° and an azimuthal pre-tilt angle φ=0° and therefore rotate counter-clockwise, if an electric field is applied.

The combination of the effects as discussed of FIGS. 4 and 5 can be seen in FIG. 6A: the inclined field components (indicated by the two inclined arrows) near the transition region 74 are directed rather parallel to the pre-orientation of the LC molecules 70 and therefore even support the smoothing effect. White LC molecules 72 in FIG. 6A show again the desired orientations near the transition region 74, whereby grey molecules 70 show the achieved orientations in the electric field. As a consequence, an increased smoothing in the resulting saw-tooth shaped phase profile is recognisable due to the increased difference between desired and achieved LC orientations. For example, at the transition region 74 to the next grating period, the resulting phase profile (not shown) does not drop sharply, which leads to decreased diffraction efficiency in the first direction.

Figure 6B:
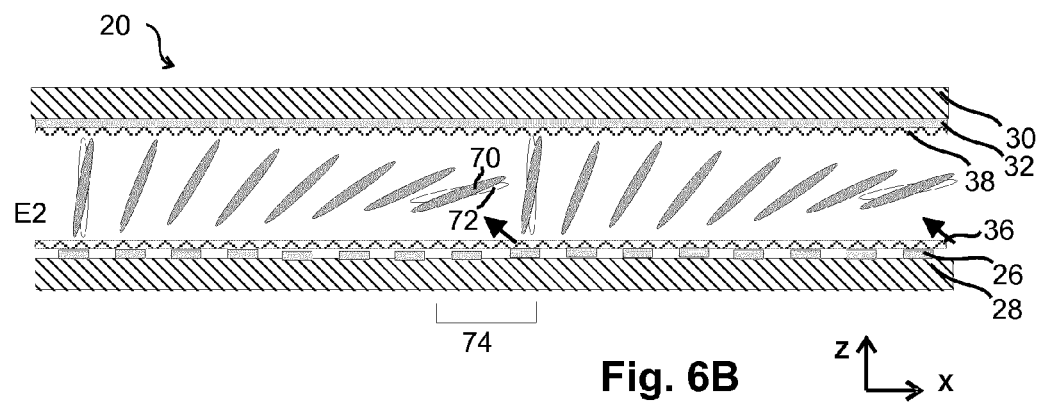
FIG. 6B is a side view that shows liquid crystals close to the alignment layer in a controllable diffraction device of the prior art diffracting light in a second direction.

In contrast, FIG. 6B shows a side view of pre-oriented LC molecules 70 close to alignment layer in the saw-tooth shaped electric field distribution E2. Thereby, the inclined field components are directed rather vertically to the pre-orientation of the LC molecules and therefore reduce the smoothing effect between the LC molecules 50. White LC molecules 72 in FIG. 6A show again the desired orientations near the transition region 74, whereby grey molecules 70 show the achieved orientations in the electric field. Thus, a decreased smoothing in the resulting saw-tooth shaped phase profile in comparison to FIG. 6A is recognisable due to the decreased difference between desired and achieved LC orientations. For example, at the transition region 74 to the next grating period, the resulting phase profile (not shown) drops more sharply, which leads to an increased diffraction efficiency in the opposite second direction compared to FIG. 6A.

Figure 7A:
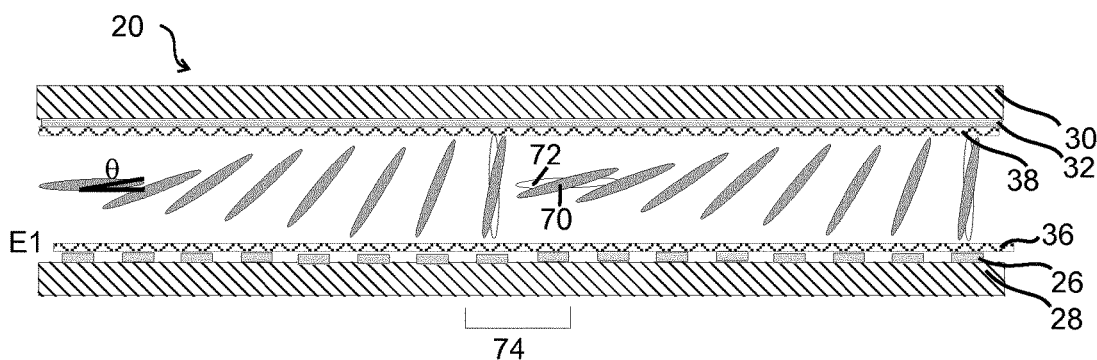
FIG. 7A is a side view that shows liquid crystals close to the alignment layer of a controllable diffraction device according to the present invention diffracting light in a first direction.
Figure 7B:
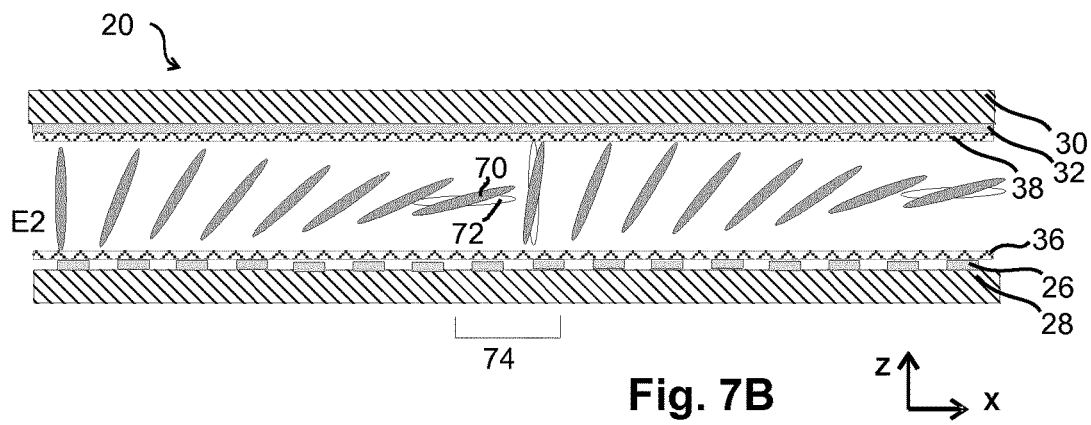
FIG. 7B is a side view that shows liquid crystals close to the alignment layer of a controllable diffraction device according to the present invention diffracting light in a second direction.

FIG. 7A shows a first embodiment of the present invention with pre-oriented LC molecules close to the alignment layer in the saw-tooth shaped electric field distribution E1, whereby FIG. 7B shows the same arrangement in the saw-tooth shaped electric field distribution E2. Similar to FIGS. 4 to 6, LC molecules 70 provided in the Electronically Controlled Birefringence (ECB) mode are shown in FIGS. 7A and 7B.

In the ECB mode, the polar pre-tilt angle θ is in the range of $0° < \theta \leq 3°$, more preferably in the range of $0° < \theta \leq 2°$. Thus, the LC molecules are still pre-oriented so as to allow a coherent rotation in the electric field, which is actually counter-clockwise in FIGS. 7A and 7B. Moreover, as can be seen in FIGS. 7A and 7B, the difference near the transition region 74 between the white LC molecules 72 having the desired orientation and the grey LC molecules 70 having the achieved orientation is in both electric field distributions E1 and E2 approximately the same since smoothing effects are approximately equal for E1 and E2 for the above-mentioned reduced polar pre-tilt angles. Therefore, the diffraction efficiency in both directions is approximately equal due to the polar pre-tilt angle θ being in the range of $0°<θ≤3°$, more preferably in the range of $0°<θ≤2°$.

According to the present invention, LC molecules provided in the Vertical Aligned (VA) mode are pre-oriented by an polar pre-tilt angle θ, which is in the range of $87°≤θ<90°$, more preferably $88°≤θ<90°$ (not shown). Similarly to the ECB mode as described in FIGS. 7A and 7B, the LC molecules are still pre-oriented so as to allow a coherent rotation in the electric field, whereby an approximately equal diffraction efficiency in both directions is achieved to comparable smoothing effects for the saw-tooth shaped electric field distributions E1 and E2 in the polar pre-tilt angle range for θ according to the present invention.

Figure 8A:
FIG. 8A is a perspective view that shows a further embodiment of the controllable diffraction device of the present invention having an alignment layer with different areas.

FIG. 8A shows a further embodiment of the invention, whereby the LC molecules are pre-oriented by a polar pre-tilt angle θ. Thereby, different areas A1 and A2 are defined on the alignment layer having different the azimuthal pre-tilt angles φ, respectively. In detail, the azimuthal pre-tilt angle φ varies by 180° for both areas A1 and A2. As an example, the areas A1 and A2 of the alignment layer are arranged repetitively in the form of stripes and the azimuthal pre-tilt angles φ are alternately $φ_1=0°$ in area A1 and $φ_2=180°$ in area A2. For clarification, FIG. 8 shows only two stripes for different alignment layer areas A1 and A2. However, it has to be noted that for example, the alternating sequence of areas A1 and A2 can be repeated arbitrarily in the y-direction.

According to FIG. 8A, the first stripe-like area A1 with $φ_1=0°$ provides better diffraction efficiency in the second direction, if the saw-tooth shaped electric field distribution E2 is applied to the electrodes 26 since smoothing effects are less dominant due to inclined field components being directed rather vertically to the pre-oriented LC molecules. If the saw-tooth shaped electric field distribution E1 is applied, however, the diffraction efficiency in the first direction is reduced due to the discussed smoothing effects.

In the inverse case, the second stripe-like area A2 with $φ_2=180°$ provides better diffraction efficiency in the first direction if the saw-tooth shaped electric field distribution E1 is applied to the electrodes 26 since smoothing effects are less dominant due to inclined field components being directed rather vertically to the pre-oriented LC molecules. If the saw-tooth shaped electric field distribution E2 is applied, however, the diffraction efficiency in the second direction is reduced due to the discussed smoothing effects.

However, when averaging (spatially) over the whole area, the diffraction efficiency is in the first direction and in the second direction equal due to the alternating arrangement of stripes having the azimuthal pre-tilt angles φ changed by 180°. In other words, alternating stripes with different senses of rotation (counter-clockwise in area A1 and clockwise in area A2) of pre-oriented LC molecules are provided such that in average, the diffraction efficiency is equal for both applied electric field distributions E1 and E2 corresponding to opposite spatial directions. In general, at least two stripes per spatial light modulator (SLM) pixel pitch are provided.

Figure 8B:
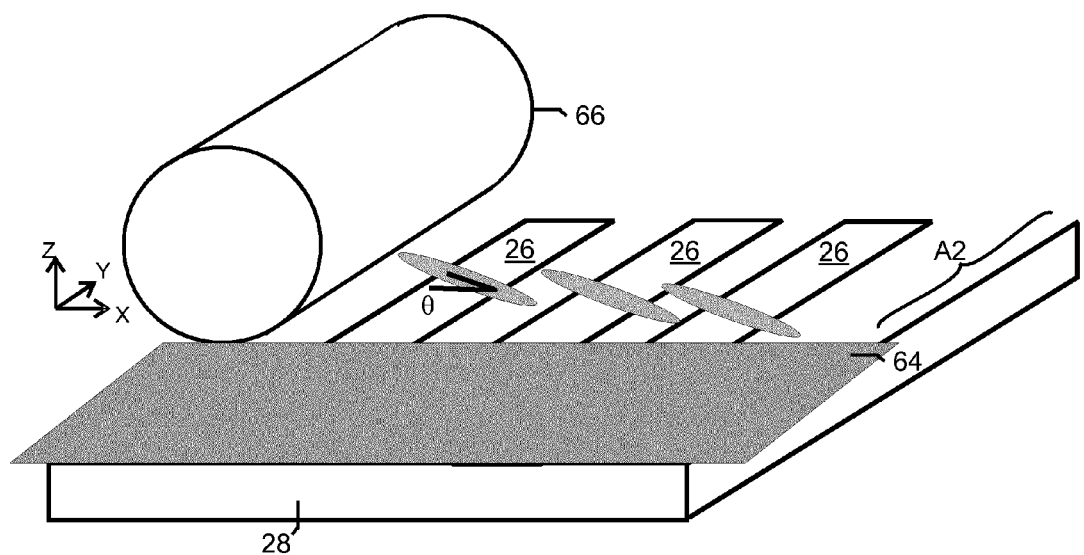
FIGS. 8B and 8C are schematic perspective views illustrating manufacturing methods for the alignment layer comprising different areas of a controllable diffraction device.

FIG. 8B illustrates a possibility of manufacturing the stripe-like areas A1 and A2 of the alignment layer as indicated in the embodiment of FIG. 8A by mechanical rubbing. After preparation of the alignment layer on the substrate, a mask 64 is used for covering the stripe-like area A1. Mechanical buffing of the stripe-like area A2 is then performed for example by moving the rubbing cloth 66 from right to left. In a following step, the mask 64 is shifted such that the stripe-like area A2 is now covered by the mask 64. Then the mechanical buffing is made a second time but now in opposite direction for example from left to right. In this way the stripe-like area A1 gets an azimuthal pre-tilt angle φ changed by 180° relative to the stripe-like area A2.

Figure 8C:
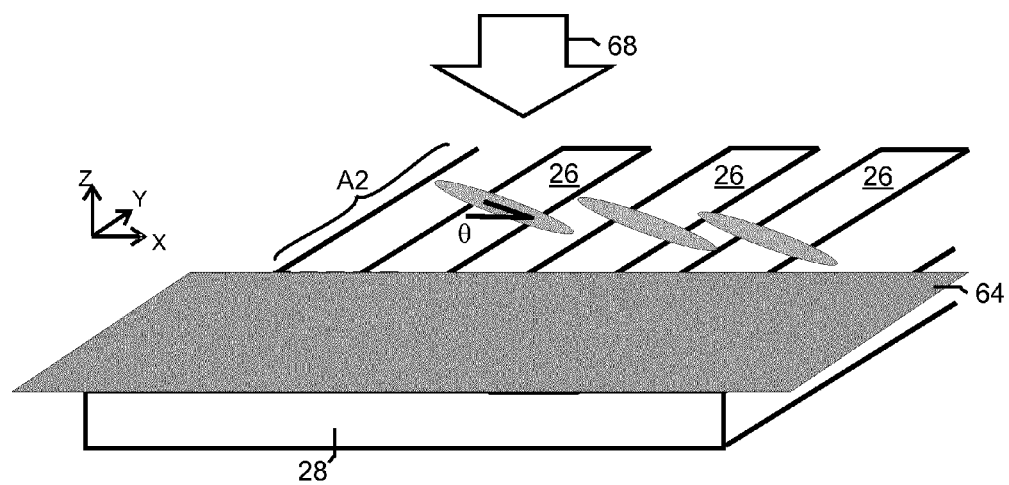

FIG. 8C illustrates another possibility of manufacturing the stripe-like areas A1 and A2 of the alignment layer. Photo-alignment is used in this case. After preparation of the photo-alignment layer on the substrate 28, a mask 64 is used for covering the stripe-like area A1. Then a first UV exposure—represented by the arrow 68—is made in order to generate photo-alignment of the stripe-like area A2. In the following the mask 64 is shifted such that the stripe-like area A2 is now covered by the mask 64. Then a second UV exposure is made to generate photo-alignment of the stripe-like area A1. By choosing suitable exposure conditions, for example by having a suitable incident angle of the UV light, the stripe-like area A1 gets an azimuthal pre-tilt angle φ changed by 180° relative to the stripe-like area A2.

Figure 9A:
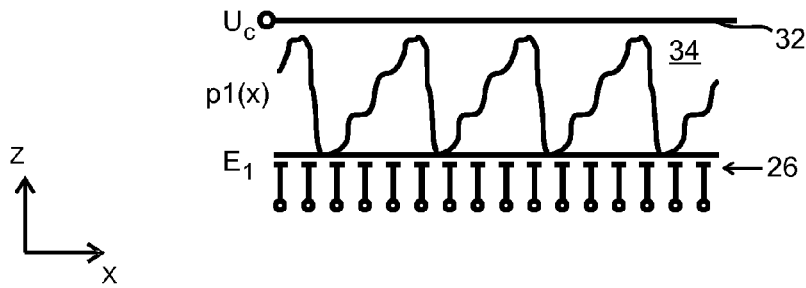
FIGS. 9A and 9B are schematic side views each showing the resulting phase distribution of a controllable diffraction device according to FIG. 8, respectively.
Figure 9B:
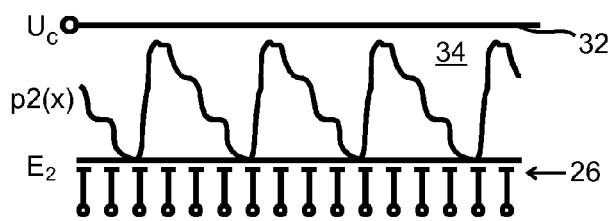

The resulting phase distributions $p1(x)$ and $p2(x)$ are shown in FIGS. 9A and 9B, which correspond to the saw-tooth shaped electric field distributions E1 and E2, respectively. Similar to E1 and E2, the phase distributions $p1(x)$ and $p2(x)$ are inverse to each other so as to diffract light in opposite directions. As can be seen in FIGS. 9A and 9B, the resulting phase distributions $p1(x)$ and $p2(x)$ are symmetrical mirror images of each other providing an equal diffraction efficiency for the first and the second diffraction direction due to the arrangement of alternating stripes with different senses of rotation as discussed above. It has to be noted that the upward or downward slope of the saw-tooth shaped phase distributions can be further smoothed by different electrode arrangements as discussed in WO 2010/149587 A2.

Figure 10A:
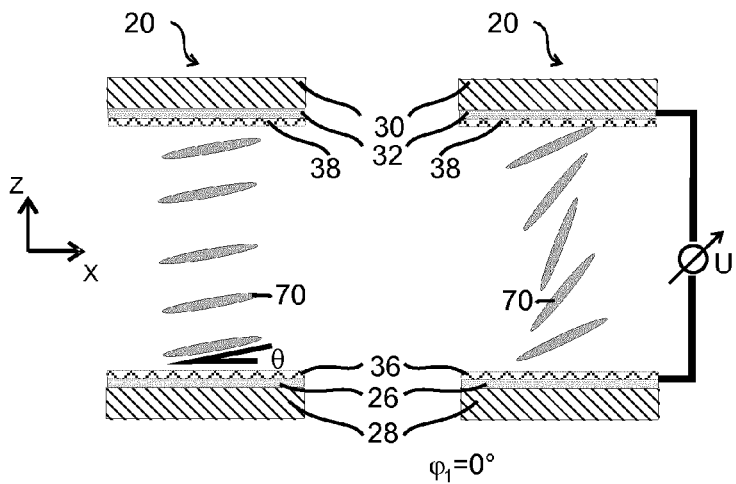
FIGS. 10A and 10B are schematic side views showing the relationship between pre-orientation, sense of rotation and applied voltages.
Figure 10B:
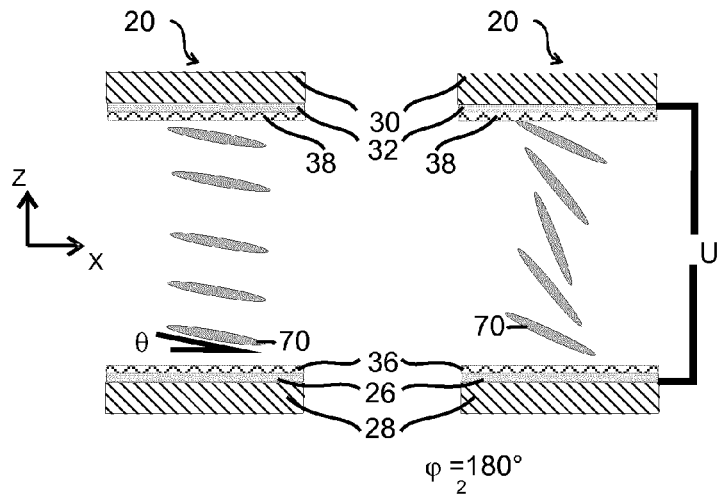

The relationship between the azimuthal pre-tilt angle φ and the sense of rotation is exemplarily shown in FIGS. 10A and 10B:

FIG. 10A is side view showing LC molecules 70 between one electrode 26 and the planar electrode 32, whereby the LC molecules are pre-oriented by a polar pre-tilt angle θ and an azimuthal pre-tilt angle $φ_1=0°$. Applying a voltage U to the electrodes 26, 32 triggers a counter-clockwise rotation of the LC molecules 50.

In contrast, FIG. 10B is side view showing LC molecules 70 between one electrode 26 and the planar electrode 32, whereby the LC molecules are pre-oriented by a polar pre-tilt angle θ and an azimuthal pre-tilt angle $φ_2=180°$. Applying a voltage U to the electrodes 26, 32 triggers a clockwise rotation of the LC molecules 50.

Moreover, it has to be noted that in the embodiment according to FIG. 8, a polar pre-tilt angle $0°<θ≤3°$, more preferably $0°<θ≤2°$, and/or a polar pre-tilt angle $87°≤θ<90°$, more preferably $88°≤θ<90°$, may be implemented to further improve the diffraction efficiency in the first and second directions since smoothing effects may further be reduced as discussed above in FIG. 7.

Figure 11A:
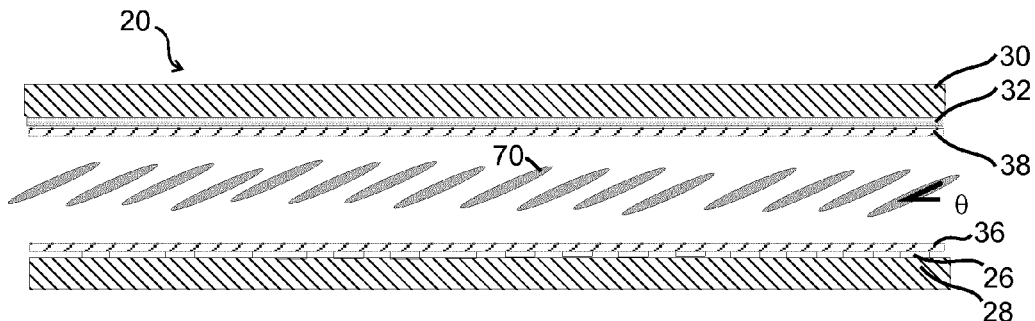
FIGS. 11A and 11B are side views that show a further embodiment of a controllable diffraction device of the present invention, whereby the pre-orientation of the liquid crystals close to the surface is switchable.

FIG. 11A shows a further embodiment of the present invention, in which a switchable alignment layer according to WO 2011/039286 A2 is used. For clarification, devices for switching the azimuthal pre-tilt angle φ of the alignment layer in are not shown in FIG. 11A. Generally speaking, bistable alignment layers, short voltages pulses and/or sequential direct driving of bulk LC layers may provide a switchable pre-orientation of LC molecules as discussed in WO 2011/039286 A2.

According to FIG. 11A, LC molecules 70 close to the alignment layer 36 are oriented by a polar pre-tilt angle θ and an azimuthal pre-tilt angle $\phi_1=0°$. Thus, the switching state of FIG. 11A with $\phi_1=0°$ provides better diffraction efficiency in the second direction, if the saw-tooth shaped electric field distribution E2 is applied to the electrodes 26 since smoothing effects are less dominant due to inclined field components being directed rather vertically to the pre-oriented LC molecules.

Figure 12A:
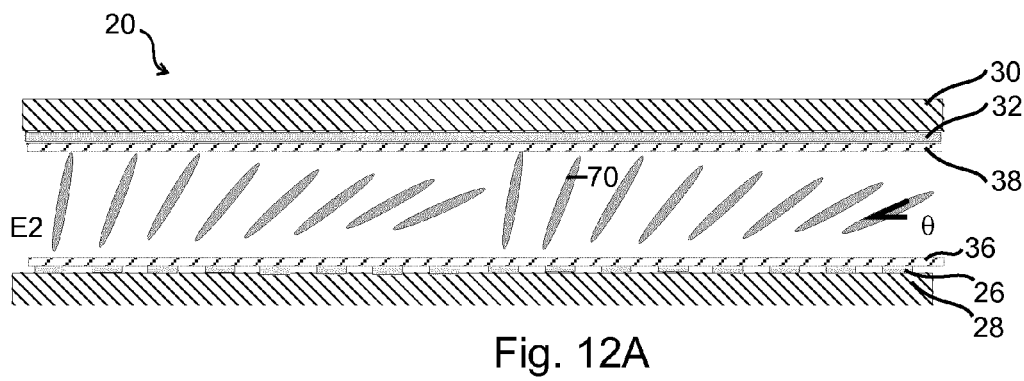
FIGS. 12A and 12B are side views that show liquid crystals close to the alignment layer and in an electric field according to the switching states of FIGS. 11A and 11B, respectively.

FIG. 12A shows the pre-oriented LC molecules 70 having an azimuthal pre-tilt angle $\phi_1=0°$ of FIG. 11A, when the saw-tooth shaped electric field distribution E2 is applied. As a consequence, the controllable diffraction device 20 can provide a better and sharper diffraction in the second direction if the switching state with an azimuthal pre-tilt angle $\phi_1=0°$ is applied.

Figure 11B:
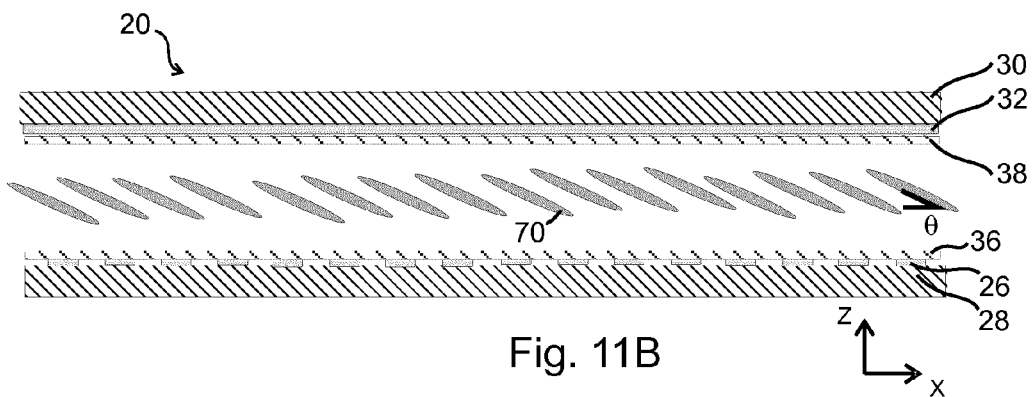

In contrast, if the controllable diffraction device 20 has to provide a diffraction of the light in the first direction, the second switching state as shown in FIG. 11B is applied: thereby, LC molecules 70 close to the alignment layer 36 are oriented by a polar pre-tilt angle θ and an azimuthal pre-tilt angle $\phi_2=180°$. Thus, the switching state of FIG. 11B with $\phi_2=180°$ provides better diffraction efficiency in the first direction, if the saw-tooth shaped electric field distribution E1 is applied to the electrodes 26 since smoothing effects are less dominant due to inclined field components being directed rather vertically to the pre-oriented LC molecules.

Figure 12B:
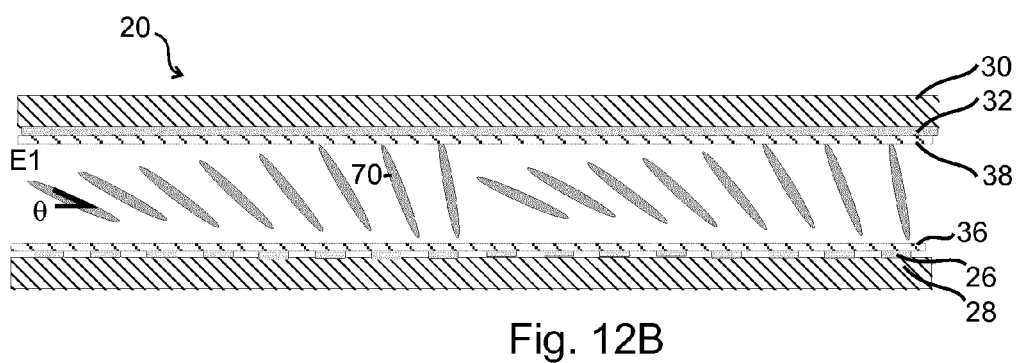

FIG. 12B shows the pre-oriented LC molecules 70 having an azimuthal pre-tilt angle $\phi_2=180°$ of FIG. 11B, when the saw-tooth shaped electric field distribution E1 is applied. As a consequence, the controllable diffraction device 20 can provide a better and sharper diffraction in the first direction if the switching state with an azimuthal pre-tilt angle $\phi_2=180°$ is applied.

In summary, since in the embodiment shown in FIGS. 11 and 12 the clockwise or counter-clockwise sense of rotation as explained in FIGS. 10A and 10B is selectively chosen according to the desired first or second diffraction direction, the diffraction efficiency in both directions is equal.

Moreover, it has to be noted that in the embodiment according to FIGS. 11 and 12, a polar pre-tilt angle $0°<θ≤3°$, more preferably $0°<θ≤2°$, and/or a polar pre-tilt angle $87°≤θ<90°$, more preferably $88°≤θ<90°$, as discussed above in FIG. 7 may be implemented to further improve the diffraction efficiency in the first and second directions since smoothing effects may further be reduced as discussed above.

Figure 13A:
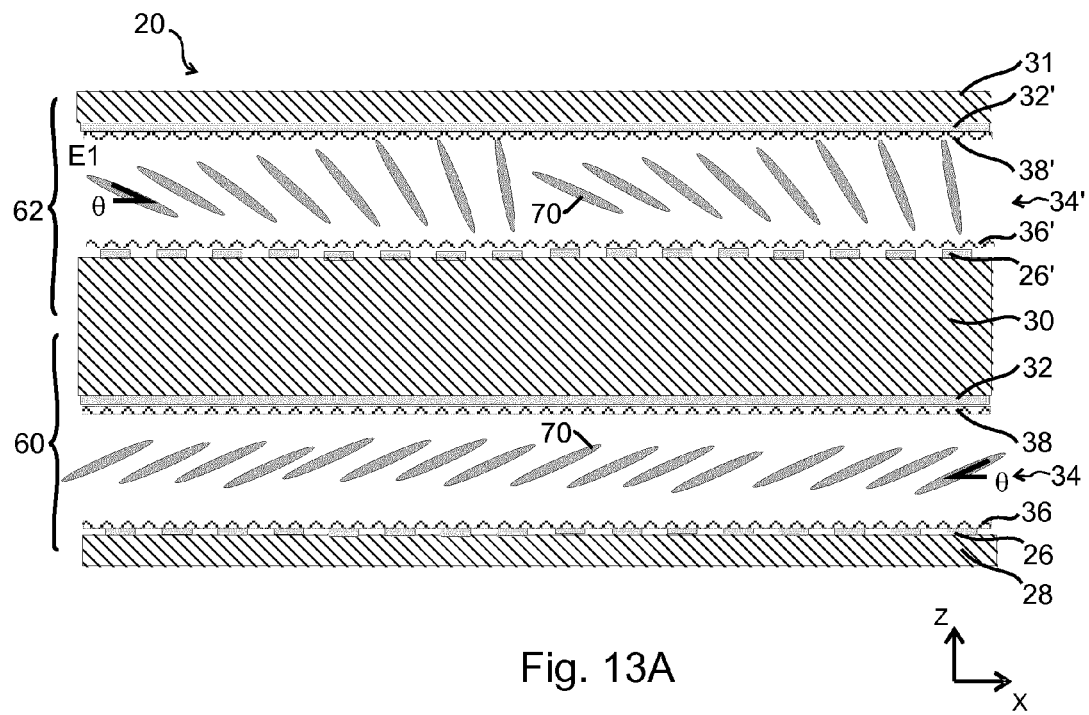
FIG. 13A is a side view of a further embodiment of the controllable diffraction device of the present invention diffracting light in a preferred first direction.
Figure 13B:
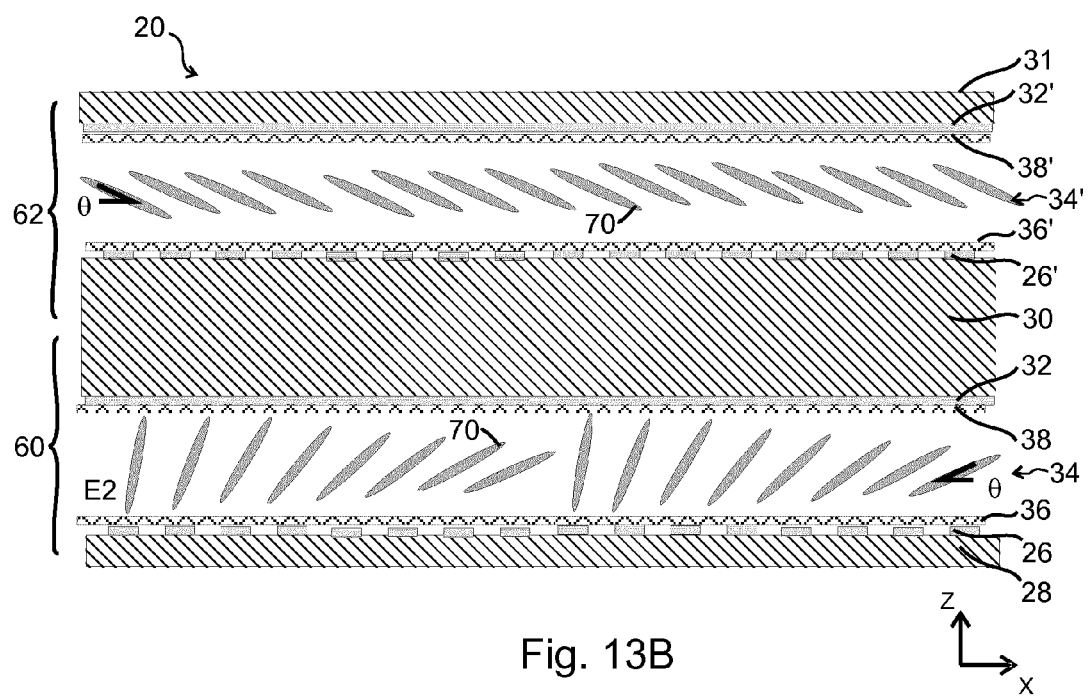
FIG. 13B is a side view of a further embodiment of the controllable diffraction device of the present invention diffracting light in a preferred second direction.

FIGS. 13A and 13B show a further embodiment of the invention, whereby the controllable deflection device 20 provides a third substrate 31 arranged in the z-direction above the first substrate 28 and the second substrate 30.

Similar to other embodiments, linear electrodes 26, the first alignment layer 36, the liquid crystal layer 34, the second alignment layer 38 and the planar electrode 32 are arranged between the first substrate 28 and the second substrate 30. Thus, a first liquid crystal grating 60 is formed.

Likewise, linear electrodes 26', a third alignment layer 36', a second liquid crystal layer 34', a fourth alignment layer 38' and a second planar electrode 32' are arranged between the second substrate 30 and the third substrate 31 as shown in FIGS. 13A and 13B. Thus, a second liquid crystal grating 62 is formed.

Thereby, the first alignment layer 36 and the third alignment layer 36' provide different azimuthal pre-tilt angles ϕ for the LC molecules 70 close to the alignment layers 36, 36'. In detail, the azimuthal pre-tilt angle ϕ varies by 180° for the first alignment layer 36 and the third alignment layer 36'. As an example, the azimuthal pre-tilt angles ϕ are alternately $\phi_1=0°$ on the first alignment layer 36 and $\phi_2=180°$ in the third alignment layer 36'.

However, the first alignment layer 36 and the third alignment layer 36' provide the same polar pre-tilt angle θ. This arrangement is not limited to a certain range of pre-tilt angle θ. But preferably the pre-tilt angle θ is in the range of $10°≤θ≤30°$, more preferably $10°≤θ≤20°$, for the LC molecules 70 close to the alignment layers 36, 36'.

According to FIG. 13A, the second liquid crystal grating 62 with $\phi_2=180°$ provides better diffraction efficiency in the first direction if the saw-tooth shaped electric field distribution E1 is applied to the electrodes 26' since smoothing effects are less dominant due to inclined field components being directed more vertically to the pre-oriented LC molecules 50. Thus, an improved saw-tooth shaped phase profile for the first direction is provided due to the polar pre-tilt angle θ, which preferably is in the range of $10°≤θ≤30°$, more preferably $10°≤θ≤20°$. However, due to the increased polar pre-tilt angle θ, which preferably is in the range of $10°≤θ≤30°$, more preferably $10°≤θ≤20°$, the diffraction efficiency in the second direction would be significantly deteriorated if the saw-tooth shaped electric field distribution E2 was applied to the second liquid crystal grating 62. In general, no voltages are applied to the electrodes 26, 32 of the first liquid crystal grating 60, when the second liquid crystal grating 62 is supplied with voltages.

In the inverse case in FIG. 13B, the first liquid crystal grating 60 with $\phi_1=0°$ provides better diffraction efficiency in the second direction, if the saw-tooth shaped electric field distribution E2 is applied to the electrodes 26 since smoothing effects are less dominant due to inclined field components being directed more vertically to the pre-oriented LC molecules 50. Thus, an improved saw-tooth shaped phase profile for the first direction is provided due to the polar pre-tilt angle θ, which preferably is in the range of $10°≤θ≤30°$, more preferably $10°≤θ≤20°$. However, due to the increased polar pre-tilt angle θ, which preferably is in the range of $10°≤θ≤30°$, more preferably $10°≤θ≤20°$, the diffraction efficiency in the second direction would be significantly deteriorated if the saw-tooth shaped electric field distribution E1 was applied to the first liquid crystal grating 60. In general, no voltages are applied to the electrodes 26', 32' of the second liquid crystal grating 62, when the first liquid crystal grating 60 is supplied with voltages.

In summary, the controllable diffraction device 20 according to FIGS. 13A and 13B comprises two liquid crystal gratings 60, 62 with different diffraction efficiencies for first and second directions. Thereby, the first liquid grating 60 provides an optimized diffraction into the second direction, if the saw-tooth shaped electric field distribution E2 is applied to the first liquid grating 60. In contrast, the second liquid grating 62 provides an optimized diffraction into the first direction, if the saw-tooth shaped electric field distribution E1 is applied to the second liquid grating 62. As a consequence, due to the same polar pre-tilt angle θ, which preferably is in the range of $10°≤θ≤30°$, more preferably $10°≤θ≤20°$ for both liquid crystal gratings 60, 62, the resulting light diffraction in the opposite first and second directions is improved and equal when selectively applying the distributions E1 or E2 as discussed above.

Moreover, it is mentioned that the electrodes 26, 32, 26' 32' of the first and second liquid crystal grating 60, 62 are transparent for the used light. The same goes for the first, second and third substrate 28, 30, 31. The refractive index of the electrodes 26, 32, 26' 32' is substantially identical to the refractive index of the substrates 28, 30, 31. Further, the refractive index of the electrodes 26, 32, 26' 32' is substantially identical to the refractive index of the alignment layers 36, 38, 36', 38'.

According to the present invention, LC molecules provided in the Vertical Aligned (VA) mode are pre-oriented by an polar pre-tilt angle θ, which preferably is in the range of 60°≤θ≤80°, more preferably 70°≤θ≤80° (not shown). Similarly to the ECB mode as described in FIGS. 13A and 13B, the pre-orientation of the LC molecules is thereby further increased. Due to the same polar pre-tilt angle θ, which preferably is in the range of 60°≤θ≤80°, more preferably 70°≤θ≤80° for both liquid crystal gratings 60, 62, this provides an equal and improved light diffraction in the opposite first and second directions when selectively applying the distributions E1 or E2 as discussed.

Finally, it must be said that the embodiments described above shall solely be understood to illustrate the claimed teaching, but that the claimed teaching is not limited to these embodiments.

In particular, a display for the presentation of two- and/or three-dimensional image contents or image sequences may comprise several controllable diffraction devices 20, which can be arranged next to or above each other.

Furthermore, the terms "first direction" and "second direction" are understood as opposite directions, which may characterize left, right, upward and/or downward directions for spatial diffraction directions, which depend on the assembly of the controllable diffraction device 20 of the present invention in a display for presenting stereoscopic image contents and/or stereoscopic multi-view image contents and/or holographic image contents.

Moreover, devices for switching or adjusting the pre-orientation of LC molecules 70 close to the alignment layer as described in WO 2011/039286 A1 could be implemented in all embodiments of the present invention.

Generally, it has to be noted that the embodiments as described above show LC molecules 50, which are in the ECB mode. The teaching of the present invention can also be realized with LC molecules according to VA mode conditions.

Moreover, it has to be noted that in particular in FIGS. 5 to 7, 9 and 11 to 13, only LC molecules 70 close to the alignment layer 36 are depicted for reasons of clarity. In the embodiments of the present invention, other LC molecules 70 similar to FIGS. 10A and 10B are also arranged above those LC molecules 70 close to the alignment layer 36 in the z-direction, which are not shown.

Consequently, the LC molecules 70 may also be pre-oriented by polar and/or azimuthal angles as defined in the present invention close to the above alignment layers 38, 38'.

The invention claimed is:

1. Controllable diffraction device for a light modulator device in a display for presenting at least one of the following: stereoscopic image contents and stereoscopic multi-view image contents and holographic image contents, the controllable diffraction device comprising
　　at least two substrates,
　　at least one electrode on each of said substrates facing each other, and
　　liquid crystals forming at least one liquid crystal layer arranged between said electrodes on said substrates, whereby the orientation of the liquid crystals is controllable by a voltage supplied to the electrodes and the liquid crystal layer is provided on at least one alignment layer arranged on at least one electrode on said substrates,
　　whereby the electrodes are arranged such that an electric field distribution is obtained, which realizes at least regionally a variable saw-tooth-shaped diffractive structure, when voltages are applied to the electrodes, and
　　whereby the liquid crystals close to the alignment layer are pre-oriented by at least one pre-tilt angle relative to the alignment layer such that the resulting light diffraction in opposite spatial directions caused by the saw-tooth shaped diffractive structure is approximately equal.

2. Controllable diffraction device according to claim 1, whereby a polar pre-tilt angle θ is set to a value enabling a unidirectional rotation of the orientation of the liquid crystals in the liquid crystal layer.

3. Controllable diffraction device according to claim 2, whereby the polar pre-tilt angle is in the range of 0°<θ<3° or 87°≤θ<90°.

4. Controllable diffraction device according to claim 1, whereby the pre-orientation of the liquid crystals close to the alignment layer is further determined by at least one azimuthal pre-tilt angle φ.

5. Controllable diffraction device according to claim 4, whereby different areas of the alignment layer provide different azimuthal pre-tilt angles φ.

6. Controllable diffraction device according to claim 5, whereby the areas of the alignment layer are arranged repetitively in the form of stripes and the azimuthal pre-tilt angles φ are alternately $φ_1=0°$ and $φ_2=180°$.

7. Controllable diffraction device according to claim 1, comprising at least two alignment layers, whereby the alignment layers provide different azimuthal pre-tilt angles φ.

8. Controllable diffraction device according to claim 7, whereby the azimuthal pre-tilt angles φ are $φ_1=0°$ for the first alignment layer and $φ_2=180°$ for the second alignment layer.

9. Controllable diffraction device according to claim 7, whereby the polar pre-tilt angle is in the range of 10°≤θ<30° or 60°≤θ<80°.

10. Controllable diffraction device according to claim 4, further comprising a switching device for switching the azimuthal pre-tilt angle φ by 180°.

11. Display comprising a light modulator device and at least one controllable diffraction device according to claim 1, wherein the display is designed such that at least one of the following is presentable: stereoscopic image contents and stereoscopic multi-view image contents and holographic image contents.

12. Display according to claim 11, further comprising a spatial light modulator with pixels comprising a pixel pitch, where areas of the alignment layer of the controllable diffraction device are arranged repetitively in the form of stripes and the azimuthal pre-tilt angles φ are alternately $φ_1=0°$ and $φ_2=180°$ and where the width of the stripes is set such that it is smaller than one half of the pixel pitch of the pixels of the spatial light modulator or where the width of the stripes is set such that it corresponds to one half of the pixel pitch of the pixels of the spatial light modulator.

13. Method for displaying at least one of two- and three-dimensional image content or image sequences, the method comprising the following steps:

varying at least one of the phase and amplitude of a substantially collimated light wave field by a light modulation device comprising a spatial light modulator and a controller;

diffracting the light wave field by at least one controllable diffraction device according to claim 1 having a variable diffraction structure.

\* \* \* \* \*